(12) United States Patent
Nielsen

(10) Patent No.: US 11,039,571 B2
(45) Date of Patent: Jun. 22, 2021

(54) CARRIER ASSEMBLY FOR AN OPERATING UNIT OF AN AGRICULTURAL MACHINE

(71) Applicant: Kverneland Group Kerteminde A/S, Kerteminde (DK)

(72) Inventor: Rasmus Elmelund Nielsen, Gudbjerg (DK)

(73) Assignee: Kverneland Group Kerteminde A/S, Kerteminde (DK)

( * ) Notice: Subject to any disclaimer, the term of this patent is extended or adjusted under 35 U.S.C. 154(b) by 160 days.

(21) Appl. No.: 16/039,244

(22) Filed: Jul. 18, 2018

(65) Prior Publication Data

US 2018/0317374 A1 Nov. 8, 2018

Related U.S. Application Data

(63) Continuation of application No. 15/106,938, filed as application No. PCT/EP2014/079187 on Dec. 23, 2014, now Pat. No. 10,070,573.

(30) Foreign Application Priority Data

Dec. 23, 2013 (EP) ..................................... 13199340

(51) Int. Cl.
*A01D 34/66* (2006.01)
*A01B 73/00* (2006.01)
(Continued)

(52) U.S. Cl.
CPC .......... *A01D 34/661* (2013.01); *A01B 73/005* (2013.01); *A01D 34/74* (2013.01); *A01D 2101/00* (2013.01)

(58) Field of Classification Search
CPC .... A01B 73/005; A01D 34/661; A01D 34/74; A01D 2101/00; A01D 43/107; A01D 67/00
See application file for complete search history.

(56) References Cited

U.S. PATENT DOCUMENTS 3,324,639 A 6/1967 Halls et al.
3,608,284 A * 9/1971 Erdman ............... A01D 34/661
56/6

(Continued)

FOREIGN PATENT DOCUMENTS

DE 29614199 U1 10/1996
DE 19953380 A1 10/2000
(Continued)

OTHER PUBLICATIONS

Extended European Search Report in corresponding Application No. 13199340.4, dated Jul. 1, 2014, in 7 pages.
(Continued)

*Primary Examiner* — Adam J Behrens
(74) *Attorney, Agent, or Firm* — Knobbe, Martens, Olson & Bear, LLP

(57) ABSTRACT

An agricultural machine comprises an operating unit and a carrier assembly for the operating unit. The carrier assembly includes a carrier arm and a suspension system that suspends the operating unit from its center point and allows the operating unit to rotate about an axis that extends in the working direction. A support mechanism supports the weight of the operating unit and allows the height of the operating unit arm to change. The support mechanism includes an actuator located on the axis of the operating unit and configured to adjust the height of the operating unit.

13 Claims, 15 Drawing Sheets

(51) Int. Cl.
*A01D 34/74* (2006.01)
*A01D 101/00* (2006.01)

(56) References Cited

U.S. PATENT DOCUMENTS

| | | | |
|---|---|---|---|
| 3,717,981 A * | 2/1973 | van der Lely | A01D 34/03 56/6 |
| 3,841,070 A | 10/1974 | Cicci et al. | |
| 4,320,616 A * | 3/1982 | Marto | A01D 34/64 56/15.3 |
| 4,330,982 A | 5/1982 | Vissers et al. | |
| 4,392,339 A | 7/1983 | Berlivet et al. | |
| 4,550,554 A | 11/1985 | Lundahl et al. | |
| 4,739,609 A | 4/1988 | Meier et al. | |
| 5,076,042 A | 12/1991 | Koorn et al. | |
| 5,633,452 A * | 5/1997 | Bebernes | A01D 41/145 56/10.2 E |
| 5,778,647 A | 7/1998 | McLean et al. | |
| 5,901,541 A | 5/1999 | Lindquist | |
| 5,930,988 A | 8/1999 | Hanson | |
| 6,058,688 A | 5/2000 | Krambeck et al. | |
| 6,093,099 A | 7/2000 | Groff | |
| 6,360,516 B1 * | 3/2002 | Harkcom | A01B 73/005 56/15.5 |
| 6,508,050 B1 | 1/2003 | Krone et al. | |
| 6,662,539 B1 | 12/2003 | Adams et al. | |
| 6,854,251 B2 | 2/2005 | Snider | |
| 6,912,832 B1 * | 7/2005 | Thompson | A01D 34/64 172/669 |
| 7,500,341 B2 | 3/2009 | Hirominus et al. | |
| 7,658,056 B2 * | 2/2010 | Thompson | A01B 73/065 56/15.8 |
| 8,261,521 B2 * | 9/2012 | Thompson | A01D 34/661 56/15.8 |
| 8,286,566 B2 * | 10/2012 | Schilling | A01C 7/205 111/163 |
| 8,528,308 B2 * | 9/2013 | Priepke | A01D 75/30 172/311 |
| 10,070,573 B2 | 9/2018 | Nielsen | |
| 2001/0003239 A1 * | 6/2001 | Franet | A01D 57/20 56/153 |
| 2004/0221562 A1 | 11/2004 | Snider | |
| 2005/0252183 A1 | 11/2005 | Hirominus et al. | |
| 2006/0150604 A1 * | 7/2006 | Kieffer | A01B 63/10 56/15.8 |
| 2009/0293439 A1 * | 12/2009 | Phillips | A01D 75/306 56/7 |
| 2010/0031622 A1 | 2/2010 | Frey | |
| 2011/0005181 A1 | 1/2011 | Albertsson et al. | |
| 2011/0047948 A1 * | 3/2011 | Thompson | A01D 34/661 56/17.1 |
| 2011/0173940 A1 * | 7/2011 | Priepke | A01D 75/30 56/6 |
| 2011/0302897 A1 | 12/2011 | Hoffman et al. | |
| 2012/0060459 A1 | 3/2012 | Hironimus et al. | |
| 2016/0029560 A1 | 2/2016 | Jespersen | |
| 2016/0088795 A1 | 3/2016 | Karlsson | |
| 2016/0157425 A1 | 6/2016 | Jespersen | |

FOREIGN PATENT DOCUMENTS

| | | | |
|---|---|---|---|
| EP | 0061818 A1 | 10/1982 | |
| EP | 0558437 A1 | 9/1993 | |
| EP | 0593377 A1 | 4/1994 | |
| EP | 0876748 A1 | 11/1998 | |
| EP | 0876748 A1 * | 11/1998 | A01D 34/662 |
| EP | 0945051 B1 | 7/2003 | |
| EP | 1389413 A2 | 2/2004 | |
| EP | 1405556 A2 | 4/2004 | |
| EP | 1800529 A1 * | 6/2007 | A01D 34/661 |
| EP | 1800529 A1 | 6/2007 | |
| EP | 1321027 B1 | 2/2008 | |
| EP | 2174538 A1 * | 4/2010 | F15B 15/1409 |
| EP | 2174538 A1 | 4/2010 | |
| EP | 2526758 A1 | 11/2012 | |
| EP | 2526758 A1 * | 11/2012 | A01D 34/661 |
| EP | 2544519 A1 | 1/2013 | |
| EP | 2644015 A2 * | 10/2013 | A01D 75/30 |
| EP | 2644015 A2 | 10/2013 | |
| EP | 2789224 A1 | 10/2014 | |
| FR | 2530398 A2 | 1/1984 | |
| FR | 2530398 A2 * | 1/1984 | A01B 51/04 |
| GB | 1597276 A | 9/1981 | |
| GB | 2088684 A | 6/1982 | |
| GB | 2104765 B | 3/1983 | |
| GB | 2104765 B * | 1/1985 | A01D 34/661 |
| IT | MI20101985 A1 | 4/2012 | |
| WO | WO 2014/166802 A1 | 10/2014 | |
| WO | WO 2015/010808 A1 | 1/2015 | |
| WO | WO 2015/097230 A1 | 7/2015 | |
| WO | WO 2017/076555 A1 | 5/2017 | |
| WO | WO-2017076555 A1 * | 5/2017 | A01B 73/00 |

OTHER PUBLICATIONS

Extended European Search Report from related European Patent Application No. 18152635.1, dated Apr. 30, 2018, in 9 pages.
Examination Report in corresponding European Patent Application No. 18152635.1, dated Nov. 27, 2019, in 7 pages.
Intention to Grant in corresponding European Patent Application No. 18152635.1, dated Sep. 10, 2020, in 15 pages.

* cited by examiner

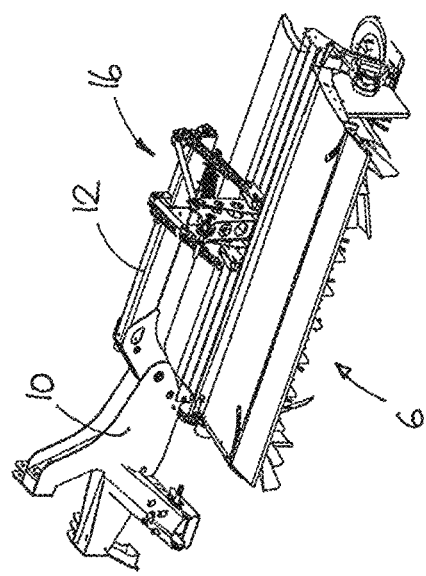
Fig. 6
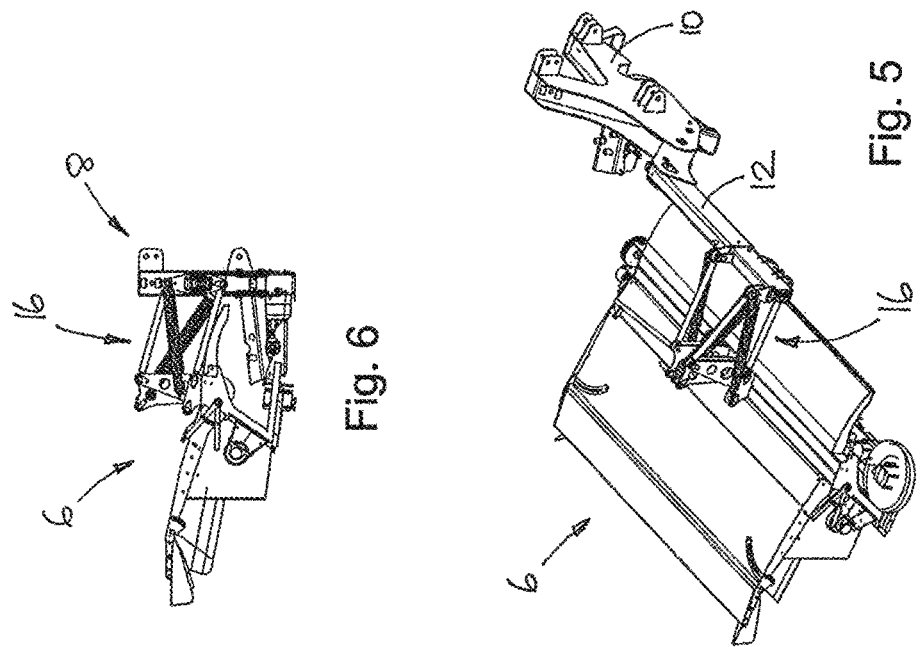
Fig. 12
Fig. 5

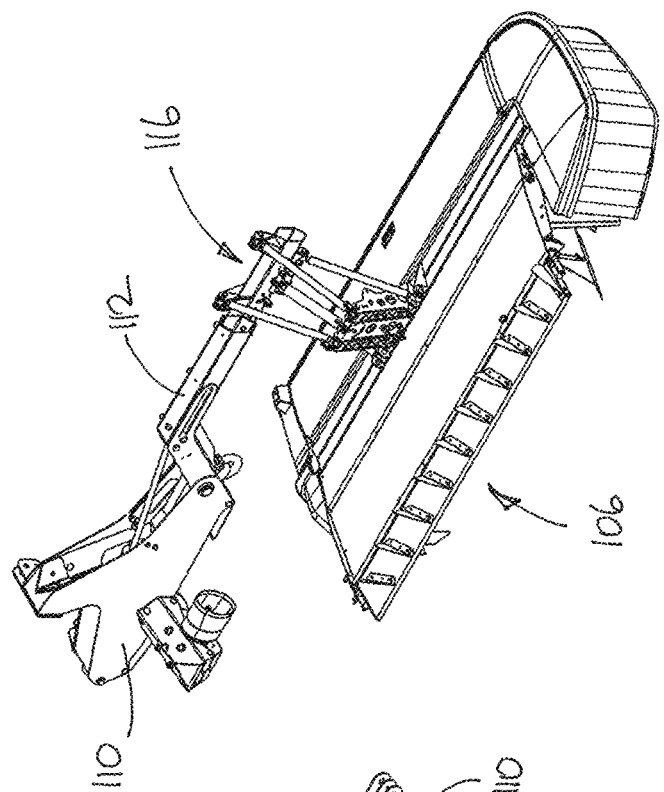
Fig. 23
Fig. 22
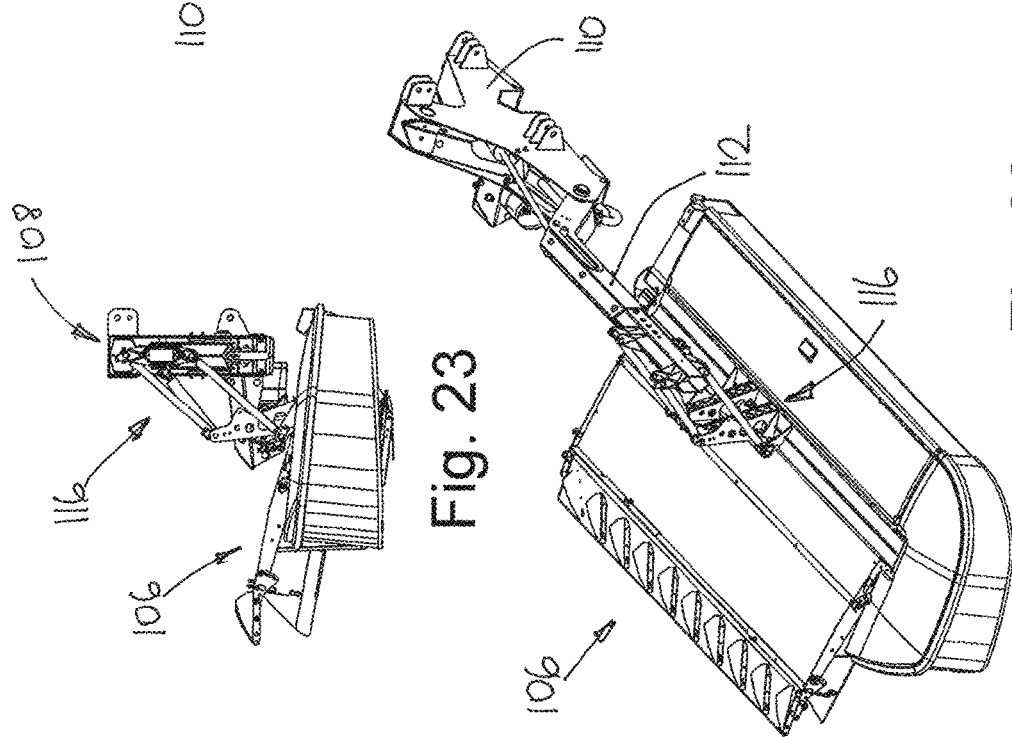
Fig. 26

CARRIER ASSEMBLY FOR AN OPERATING UNIT OF AN AGRICULTURAL MACHINE

CROSS REFERENCE

This application is continuation of U.S. patent application Ser. No. 15/106,938, filed Jun. 21, 2016, which is a U.S. National Phase of PCT International Application No. PCT/EP2014/079187, filed Dec. 23, 2014 and published as WO 2015/097230 on Jul. 2, 2015, which claims priority to European Application No. 13199340.4, filed Dec. 23, 2013. The entire disclosure of each of the above-identified applications is hereby incorporated by reference.

BACKGROUND

Field

The present disclosure relates to an agricultural machine and a carrier assembly for an operating unit of an agricultural machine. In an embodiment, the disclosure relates to an agricultural mowing machine and a carrier assembly for a cutter unit of an agricultural mowing machine.

Certain Related Art

A known type of agricultural mowing machine that may be used for harvesting hay, straw and similar crops has a cutter unit comprising a plurality of rotary cutter heads attached to a cutter bar. The cutter heads rotate about vertical axes and are provided with cutter blades that cut the crop. The rotary cutter heads may be of the disc-type or drum-type. The mowing machine may be a conditioning mowing machine that includes a plurality of flails for conditioning the cut crop, or a plain mowing machine that has no conditioning unit.

The operating unit may be carried by a carrier vehicle, for example a tractor. In the case of an agricultural mowing machine cutter units may be mounted on one or both sides of a tractor or other agricultural carrier vehicle, each cutter unit being carried by a carrier assembly that includes a carrier arm and is attached to the rear of the tractor. The carrier assembly may include a pivot mechanism that allows the position of the carrier arm to be adjusted. The carrier arm may for example be located in a cutting position in which the cutter unit is positioned close to the ground to cut the crop, or a transport position in which the cutter unit is lifted behind the cab of the tractor, allowing the tractor to travel along a road. The carrier arm or the cutter unit may also be raised to a headland position in which the cutter unit is lifted a small distance above the cutting position, allowing the tractor to turn when it reaches the headland.

Other types of agricultural machine including rakes, tedders, seeding machines and soil working machines may be mounted in a similar manner with an operating unit (a rake, tedder, seeding machine or soil working machine) mounted on one or both sides of a tractor and carried by a carrier assembly that includes a carrier arm and is attached to the rear of the tractor. Again, the carrier assembly may include a pivot mechanism that allows the position of the carrier arm to be adjusted. The carrier arm may be located in an operating position in which the operating unit is positioned close to the ground or a transport position in which the operating unit is lifted behind the cab of the tractor, allowing the tractor to travel along a road. The carrier arm or the operating unit may also be raised to a headland position in which the operating unit is lifted a small distance above the operating position, allowing the tractor to turn when it reaches the headland.

A mowing machine of the general type described above is disclosed in DE 29614199U1. A cutter unit is suspended from the end of a carrier arm through a pivot joint, which is located centrally between the ends of the cutter unit. The pivot joint has a pivot axis that extends parallel to the working direction of the mowing machine and the cutter unit can rotate about this axis during use, allowing it to follow the contours of the ground. The carrier arm can be lifted from the cutting position to a travelling position in which the cutter unit is carried behind the tractor.

EP 0945051B1 describes another mowing machine in which the cutter unit is suspended from the carrier arm by a swivel joint at the center of the cutter unit. The swivel joint is configured to allow rotation of the cutter head about a first pivot axis that extends parallel to the working direction of the mowing machine. The swivel joint also allows rotation of the cutter head about a second axis that is perpendicular to the first axis: the second axis may for example be a substantially vertical axis.

SUMMARY

Embodiments of the present disclosure relate to various kinds of agricultural machinery including, but not limited to, mowing machines, rakes, tedders, seeding machines and soil working machines, including disc harrows and cultivators. Further embodiments relate to a carrier assembly for an operating unit of an agricultural machine, where the operating unit is a cutter unit, a rake, a tedder, a seeding machine or a soil working machine.

A disadvantage with the mowing machine described in DE 29614199U1 is that it does not allow for sideshift (sideways movement of the mowing unit) relative to the axis of the tractor. Sideshift may be useful either when setting the machine up, for example to provide different operating widths, or to allow lateral adjustment of the cutter unit relative to the tractor during mowing, for example to ensure a constant overlap with a previously cut strip. Also, even if sideshift were possible, DE 29614199U1 does not disclose any mechanism for adjusting the energy level of any energy accumulators (for example springs or hydraulic bladders) associated with the carrier arm, in order to compensate for changes in the turning force transmitted through the carrier arm. Sideshift movement of the mowing unit is therefore impractical in the mechanism disclosed in DE 29614199U1.

Also, if the cutter unit strikes an obstacle on the ground during a mowing operation this can cause the cutter unit to twist about a substantially vertical axis, placing a strain on the pivot joint and possibly leading to damage or failure of the pivot mechanism. The problem is particularly acute if the cutter unit strikes an obstacle near to one of its ends.

Also, it is not possible to adjust the height of the cutter unit relative to the carrier arm. Therefore, when working on uneven ground any vertical movement of the cutter unit relative to the tractor has to be accommodated by movement of the carrier arm, which places significant loads on any energy accumulators (for example springs or hydraulic bladders) associated with the arm.

As mentioned above, EP 0945051B1 describes another mowing machine in which the cutter unit is suspended from the carrier arm by a swivel joint at the center of the cutter unit. As with the mechanism described in DE29614199U1, sideshift movement of the mowing unit is-appears neither possible nor practical in the mechanism disclosed in EP 0945051B1.

In EP 0945051B1 the cutter unit can rotate about the first axis during use, allowing it to follow the contours of the ground. It can also rotate to a limited extent about the second axis, reducing the risk of subjecting the pivot joint to damaging shocks if the cutter unit strikes an obstruction on the ground.

In order to maintain the mowing machine cutter unit in the correct working position with the cutter unit perpendicular to the working direction, a pair of control rods are provided at the inner end of the cutter unit, which are connected to the cutter unit and to the carrier arm through ball joints. These control rods allow rotation of the cutter head about the first pivot axis but prevent rotation of the cutter head about the perpendicular second axis.

However, the control rods restrict the range of movement of the cutter head about the first pivot axis, which could mean that the cutter head is unable to follow large contours in the ground. They also inhibit or prevent lateral adjustment of the position of the cutter unit relative to the tractor. The mechanism is also rather complex and increases the weight of the mowing machine. In addition, when the carrier arm is lifted to the transport position the position of the cutter head is not well controlled. This can cause problems for example when travelling along a road with the mowing machine cutter unit in the transport position.

Also, in EP 0945051B1 it does not appear possible to adjust the height of the cutter unit relative to the carrier arm. Therefore, when working on uneven ground any vertical movement of the cutter unit relative to the tractor has to be accommodated by movement of the carrier arm, which places significant loads on any energy accumulators (for examples springs or hydraulic bladders) associated with the arm.

Similar problems arise with other types of agricultural machine that are carried by a carrier assembly including a carrier arm attached to the rear of a tractor.

The present disclosure provides an agricultural machine and a carrier assembly for an agricultural machine that mitigates one or more of the aforesaid problems.

According to one aspect of the present disclosure, there is provided an agricultural machine comprising an operating unit and a carrier assembly for the operating unit, the carrier assembly including a carrier arm and a suspension system by which the operating unit is suspended from the carrier arm, said suspension system including two pairs of connecting rods, comprising a pair of upper connecting rods and a pair of lower connecting rods, each said connecting rod being attached via joints, for example ball joints, to the operating unit and the carrier arm, wherein a first pair of said upper and lower connecting rods diverge in a working direction of the operating unit and a second pair of said upper and lower connecting rods converge in a working direction of the operating unit.

The suspension system allows the operating unit to be suspended solely from its center point, thus permitting pendular movement of the operating unit about the pivot point and allowing the operating unit to follow the contours of the ground. However, the suspension system is much stronger and less vulnerable to damage from striking obstacles on the ground than the simple pivot used in the mowing machine described in DE 29614199U1. At the same time the complexity and weight of the machine described in EP 0945051B1 is avoided.

The single suspension point also allows the position of the operating unit to be adjusted laterally relative to the tractor, for example by providing a telescopic carrier arm. By adjusting the lateral positions of one or more operating units while negotiating a curve, the risk of leaving untreated areas of ground can be avoided. A system for adjusting the positions of the cutter units of a mowing machine is described for example in EP 1321027 B, the entirety of which is hereby incorporated by reference.

The suspension system allows the height of the operating unit relative to the arm to change and this movement may be accommodated, for example by means of a single actuator or spring. Vertical movement of the operating unit, as caused for example by movement over uneven ground, can therefore be accommodated without adjusting any energy accumulators associated with the carrier arm, regardless of the length of the arm. The suspension system operates independently of any mechanism for adjusting the position or length of the carrier arm, thereby simplifying operation of the machine.

The suspension system also allows the height of the operating unit relative to the arm to be readily adjusted, for example by means of a single actuator or spring, which can be located centrally on the rotation axis so that it does not affect pendular motion of the operating unit when working.

Furthermore, when the mowing machine is raised to a transport position the operating unit naturally adopts a stable position under the force of gravity. The stability of the operating unit when it is in this position may be increased by the provision of an actuator and/or spring that exerts a self-righting force on the operating unit. This actuator/spring is preferably connected to the carrier arm at a point higher than the virtual axis of rotation of the operating unit when it is in a raised position so that it acts to increase the stability of the unit.

Advantageously, the suspension system includes a support mechanism configured to support the weight of the operating unit. The support mechanism may be located at the free end of the carrier arm, allowing the operating unit to move vertically relative to the arm and reducing or eliminating the need for the arm to pivot during working to accommodate undulations in the ground. This reduces the load on the energy accumulators associated with the arm and allows the energy level of the energy accumulators to be adjusted directly so as to influence the behaviour of the support mechanism, regardless of the position or length of the carrier arm.

The support mechanism may include an actuator configured to adjust the height of the operating unit relative to the carrier arm. This allows the height of the operating unit to be adjusted easily, for example between a working position and a headland position, or in the case of a mowing machine between different cutting positions providing different cutting heights. Preferably, the actuator is configured to act between the operating unit and the carrier arm.

The support mechanism may optionally include a resilient support element or elements configured to support at least part of the weight of the operating unit. The resilient support element or elements is preferably configured to act between the operating unit and the carrier arm. Alternatively, the resilient support elements may be omitted and the weight of the operating unit may be supported entirely by an actuator, for example hydraulic actuator, which may optionally be coupled to a hydraulic accumulator.

Advantageously, the upper connecting rods lie in an upper plane and the lower connecting rods lie in a lower plane. In a preferred embodiment a line normal to the upper plane and a line normal to the lower plane are substantially perpendicular to a width axis of the operating unit. Preferably, the upper plane is substantially parallel to the lower plane. This arrangement ensures that the operating unit is held upright and does not rotate about a horizontal axis as it moves in a vertical direction relative to the carrier arm.

Advantageously, the carrier assembly includes a mounting structure configured for mounting the operating unit on a carrier vehicle and a pivot mechanism configured to allow pivoting movement of the carrier arm relative to the mounting structure about a pivot axis that extends substantially parallel to the working direction of the agricultural vehicle. This allows the carrier arm to move between a working position and a transport position in which the operating unit is located behind the cab of the carrier vehicle. The carrier assembly preferably includes a drive mechanism for driving pivoting movement of the carrier arm, allowing it to be moved easily between the different positions. The pivot mechanism is preferably configured to provide for pivoting movement of the carrier arm between an upright position in which the arm is substantially vertical and a lowered position in which the arm extends substantially parallel to the ground. The upright position allows the operating unit to be stowed behind the cab of the carrier vehicle for transportation along roads or through narrow gateways/doorways. When the arm is in the lowered position the operating unit may be configured in a working position or a headland position.

The carrier arm preferably includes an inner arm section and an outer arm section that can be extended relative to the inner arm section to adjust the length of the carrier arm, allowing the position of the operating unit to be adjusted laterally relative to the carrier vehicle. Advantageously, the agricultural machine includes an actuator for adjusting the length of the carrier arm. This makes it possible to adjust the operating position of the cutter unit during a mowing operation, for example to ensure that the edge of the cut strip of crop is aligned correctly with the edge of a strip cut previously. Adjustment of the lateral position of the cutter unit may be carried out automatically or semi-automatically, for example using an operating method as described in EP1321027B1.

In one preferred embodiment the machine is a mowing machine and the operating unit is a cutter unit. The cutter unit preferably includes a plurality of rotary cutter heads mounted on a cutter bar or support frame.

According to another aspect, there is provided a carrier assembly for carrying the operating unit of an agricultural machine, the carrier assembly including a carrier arm and a suspension system by which the operating unit can be suspended from the carrier arm, said suspension system including a mounting structure for attaching the suspension system to an operating unit and two pairs of connecting rods comprising a pair of upper connecting rods and a pair of lower connecting rods, each said connecting rod being attached via joints to the mounting structure and the carrier arm, wherein a first pair of said upper and lower connecting rods diverge in a working direction of the operating unit and a second pair of said upper and lower connecting rods converge in a working direction of the operating unit. The carrier assembly may be used for retrofitting to an existing conventional operating unit to provide the advantages set out herein.

The carrier assembly may also include one or more features of the agricultural machine as set out in the preceding statements.

In some embodiments, the agricultural machine is a mowing machine and the operating unit is a cutter unit.

BRIEF DESCRIPTION OF THE DRAWINGS

Certain embodiments will now be described by way of example with reference to the accompanying drawings, in which:

FIG. 5 is an isometric view of the first mowing machine shown in a raised headland position;

FIG. 6 is a side view of the first mowing machine shown in the raised headline position;

FIG. 12 is an isometric view of the first mowing machine with the mowing machine unit shown in a raised headland position;

FIG. 22 is an isometric view of the second mowing machine shown in a lowered position;

FIG. 23 is a side view of the second mowing machine shown in the lowered position;

FIG. 26 is an isometric view of the second mowing machine unit with the mowing machine unit shown in a lowered position.

DETAILED DESCRIPTION OF CERTAIN EMBODIMENTS

Figure 1:
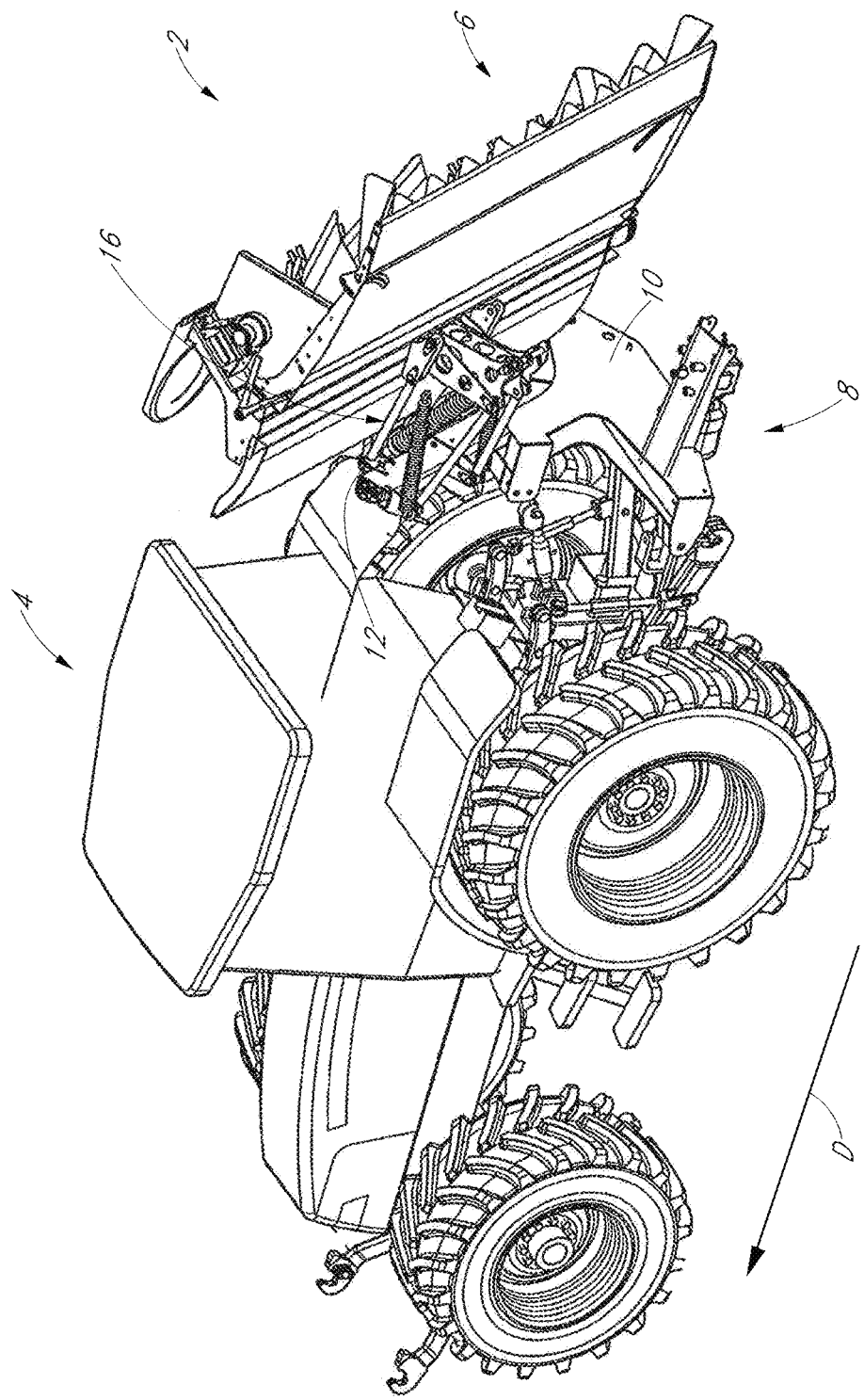
FIG. 1 is an isometric view of a first mowing machine according to an embodiment of the invention mounted on the rear of a tractor, shown in a transport position.
Figure 2:
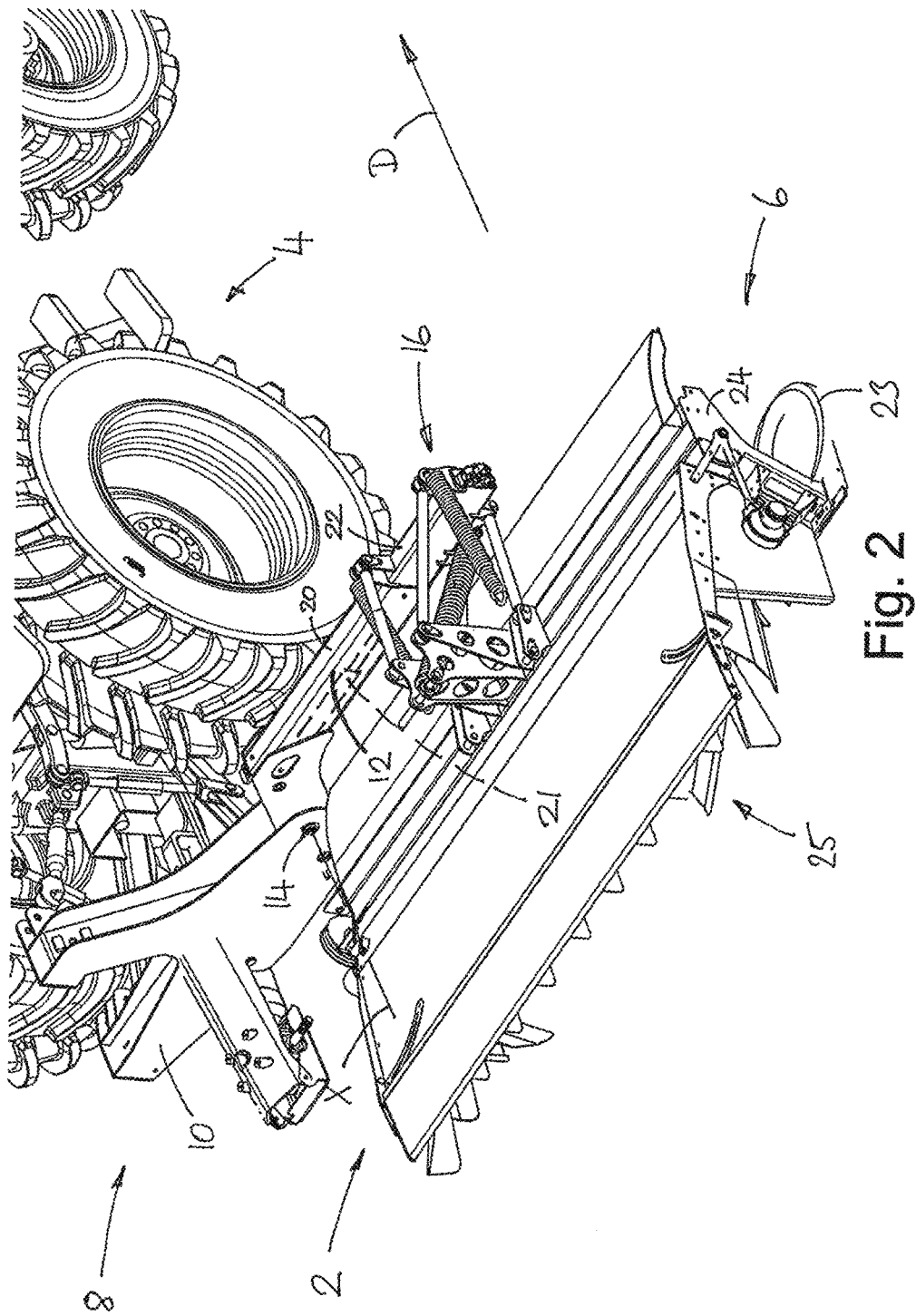
FIG. 2 is an isometric view of the first mowing machine, shown in a raised headland position.

FIGS. 1 and 2 depict a first mowing machine 2, which is attached to the rear of a tractor 4 through a three-point mounting system. It should be understood however that the this disclosure is also applicable to other kinds of agricultural machine including rakes, tedders, seeding machines and soil working machines, in which an operating unit is attached to the rear of a tractor 4.

The mowing machine 2 includes an operating unit 6 comprising a cutter unit and a carrier assembly 8 for the cutter unit. The carrier assembly 8 includes a mounting structure 10 that is attached to the tractor's three-point mounting system, a carrier arm 12 that is attached to the mounting structure 10 through a pivot mechanism 14, and a suspension system 16 through which the cutter unit 6 is suspended from the free end of the carrier arm 12.

The pivot mechanism 14 allows the carrier arm 12 to be pivoted about a pivot axis X that extends substantially parallel to the working direction D of the cutter unit 6 and includes an actuator 18, for example a hydraulic ram, that can be activated to adjust the rotational position of the arm 12 about the pivot axis X. In FIG. 1 the mowing machine is shown in a transport configuration in which the carrier arm 12 is lifted to an upright position so that the cutter unit 6 is located behind the cab of the tractor 4, while in FIG. 2 the carrier arm 12 is shown in a lowered position in which the carrier arm 12 and the cutter unit 6 are substantially parallel to the ground. When the carrier arm 12 is in the lowered position the cutter unit 6 may be adjusted relative to the carrier arm between a working position and a headland position (shown in FIG. 2) in which it is raised slightly above the working position.

The carrier arm 12 includes an inner section 20, an actuator 21 and an outer section 22 that can be extended telescopically relative to the inner section 20 to adjust the lateral position of the cutter unit 6 relative to the tractor 4. The actuator 21 may for example be a hydraulic ram located within the carrier arm 12. The telescopic carrier arm 12 thus allows for sideshift movement of the cutter unit 6 relative to the tractor 4. This allows the operating position of the cutter unit 6 to be adjusted laterally relative to the centerline of the tractor 4. This makes it possible to adjust the operating position of the cutter unit 6 during a mowing operation, for example to ensure that the edge of the cut strip of crop is aligned correctly with the edge of a strip cut previously. Adjustment of the lateral position of the cutter unit may be carried out automatically or semi-automatically, for example using an operating method as described in EP1321027B1.

The cutter unit 6 is largely conventional and includes a plurality of cutter heads 23 attached to a support frame 24 and an optional conditioning unit 25 for conditioning the crop cut by the cutter heads. The cutter unit 6 is driven via a drive shaft (not shown) from the power take-off unit of the tractor 4.

The cutter unit 6 is suspended from the free end of the carrier arm 12 by the suspension system 16, which is shown most clearly in FIG. 2. Components of the suspension system 16 are also shown schematically in FIGS. 3 and 4, together with the carrier arm 12 and the support frame 24 of the cutter unit. The suspension system 16 includes two pairs of connecting rods, comprising a pair of upper connecting rods 28 and a pair of lower connecting rods 30. The connecting rods 28, 30 all extend approximately in the working direction of the mowing machine and are attached via ball joints 32 to the cutter unit 6 and the carrier arm 12.

Figure 4:
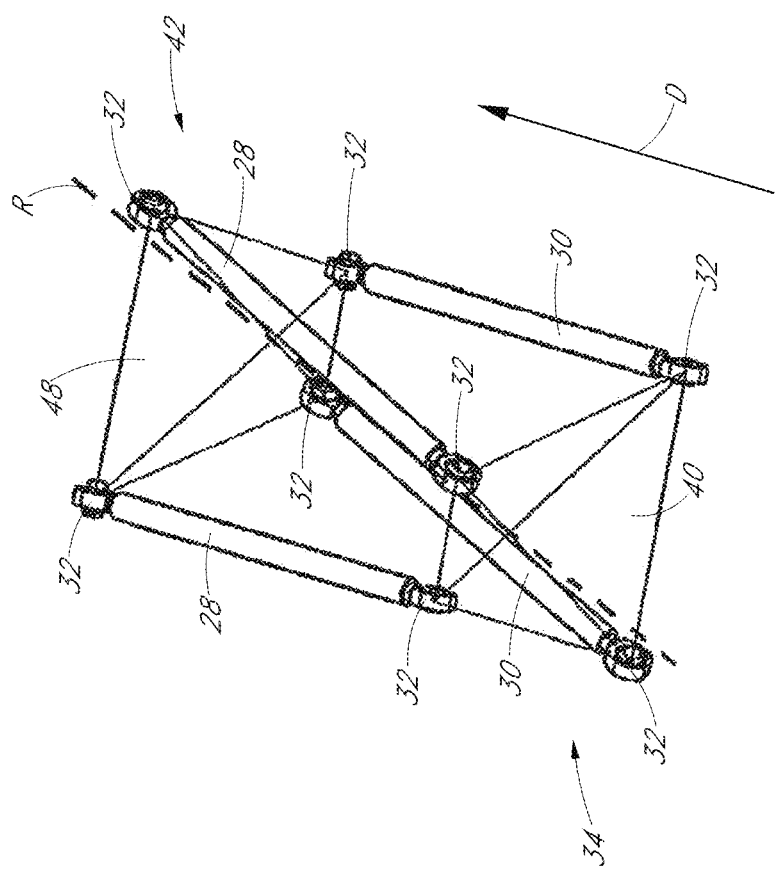
FIG. 4 is an isometric view showing schematically certain components of the suspension system.

The rear end of each connecting rod 28,30 is attached via a spherical ball joint to a mounting structure 34 that extends upwards from the support frame 24 of the cutter unit 6 and is located approximately centrally with respect to the working width of the cutter unit. In this embodiment the mounting structure includes two pairs of tall inner plates 36 that are connected to the upper connecting rods 28 and two pairs of shorter outer plates 38 that are connected to the lower connecting rods 30. The ball joints 32 at the rear ends of the connecting rods 28,30 lie in a first plane as shown in FIG. 4, referred to herein as the mo-unit plane 40. As can be seen in FIG. 4, the ball joints 32 at the rear ends of the upper connecting rods 28 are positioned more closely together than the ball joints 32 at the rear ends of the lower connecting rods 30.

The forward end of each connecting rod 28, 30 is attached via a second spherical ball joint 32 to a second mounting structure 42 provided at the free end of the carrier arm 12. In this embodiment the second mounting structure 42 includes two pairs of upper plates 44 provided on the upper part of the carrier arm 12 and two pairs of lower plates 46 provided on the lower part of the carrier arm 12. Each of the connecting rods 28, 30 is connected to one of these plates via a second ball joint 32. The second ball joints lie in a second plane as shown in FIG. 4, referred to herein as the frame plane 48. As can be seen in FIG. 4, the ball joints at the forward ends of the lower connecting rods 30 are positioned more closely together than the ball joints at the forward ends of the upper connecting rods 28.

The upper connecting rods 28 lie in an upper plane and the lower connecting rods lie in a lower plane, and in this embodiment the upper plane is parallel to the lower plane. More generally, a line normal to the upper plane and a line normal to the lower plane are each substantially perpendicular to a width axis of the cutter unit. This arrangement allows the cutter unit 6 to move substantially vertically relative to the carrier arm 12 while maintaining the cutter unit in an upright position (i.e. without rotation of the cutter unit about a horizontal axis). Alternatively, the upper and lower planes may be non-parallel, in which case vertical movement of the cutter unit relative to the carrier arm will cause a degree of rotation of the cutter unit 6 about a horizontal axis, which may be permissible in certain applications.

As explained above, the ends of the upper connecting rods 28 are closer together in the mo-plane 40 than the frame plane 48, and the upper connecting rods 28 therefore converge from the frame plane towards mo-plane. Conversely, the ends of the lower connecting rods 30 are further apart in the mo-plane 40 than the frame plane 48 and the lower connecting rods 30 therefore diverge from the frame plane to the mo-plane. The upper and lower connecting rods 28, 30 therefore act like reversed A-frames, which prevent horizontal movement of the cutter unit 16 relative to the carrier arm 12.

Because the connecting rods 28, 30 are connected to the carrier arm 12 and the mounting structure 34 of the cutter unit 6 via ball joints, the cutter unit is able to rotate relative to the carrier arm about an axis of rotation R that extends approximately in the working direction of the cutter unit. This allows the cutter unit to follow the contours of the ground while working.

As illustrated in FIG. 4, the actual axis of rotation R extends between two points, one in the mo-plane 40 and the other in the frame plane 48, each point being located at the intersection of lines drawn between the attachment points of diagonally opposed ball joints 32. The axis of rotation R therefore lies in a vertical plane that is parallel to the working direction D of the cutter unit, but is inclined downwards in the working direction.

Figure 3:
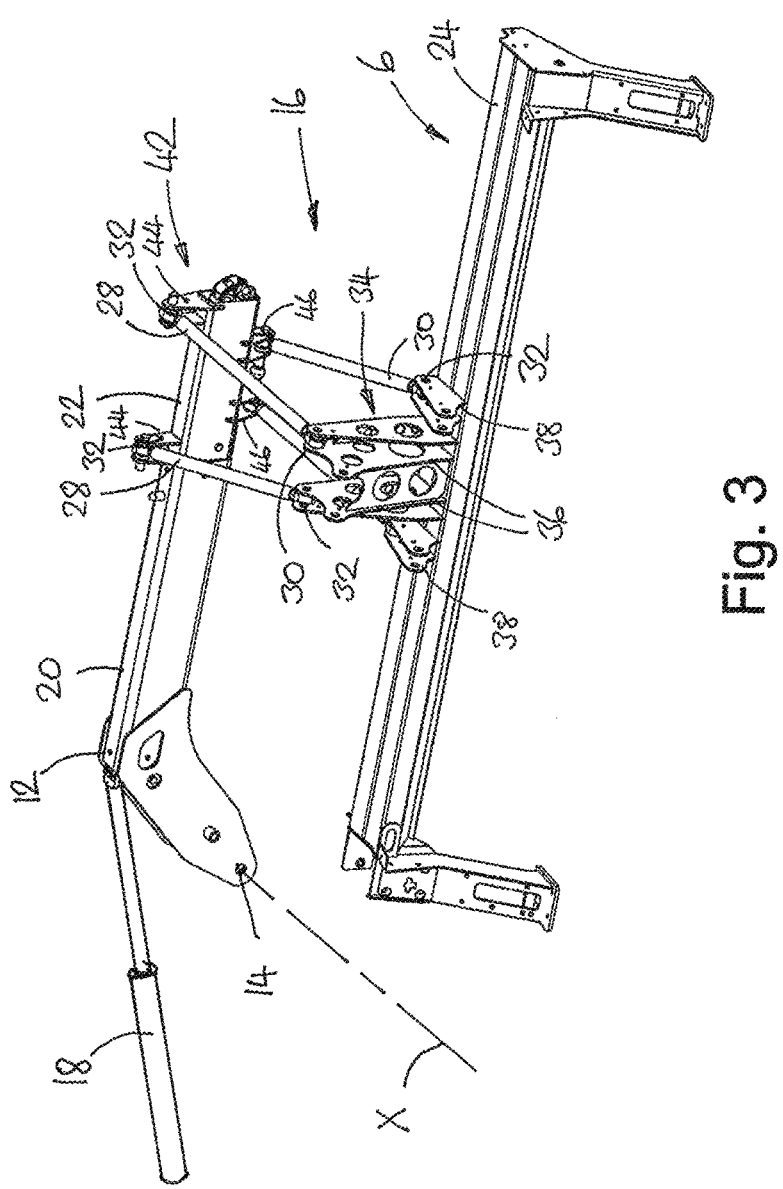
FIG. 3 is a simplified isometric view of a suspension system that forms part of the first mowing machine.

It should be understood that the connecting rod arrangement illustrated in FIGS. 3 and 4 may be inverted, whereby the upper pair of connecting rods 28 diverge from the frame plane 48 to the mo-plane 40 and the lower pair of arms 30 converge from the frame plane 48 to the mo-plane 40. This does not affect operation of the suspension system 16.

Figure 11:
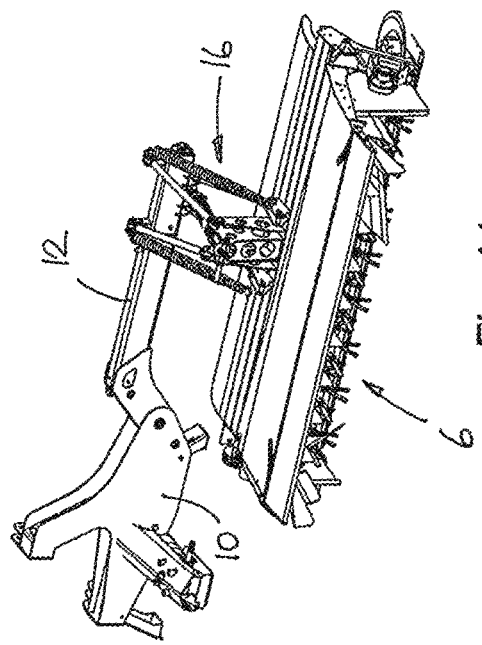
FIG. 11 is an isometric view of the first mowing machine with the mowing machine shown in a working position.
Figure 8:
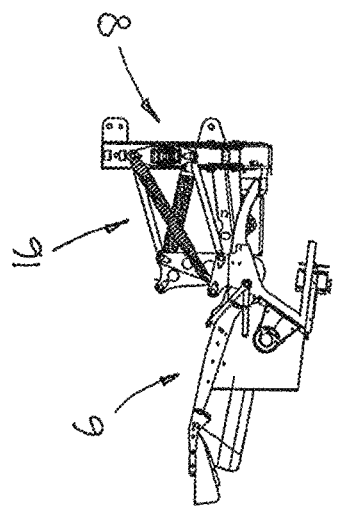
FIG. 8 is a side view of the first mowing machine shown in a working position.
Figure 7:
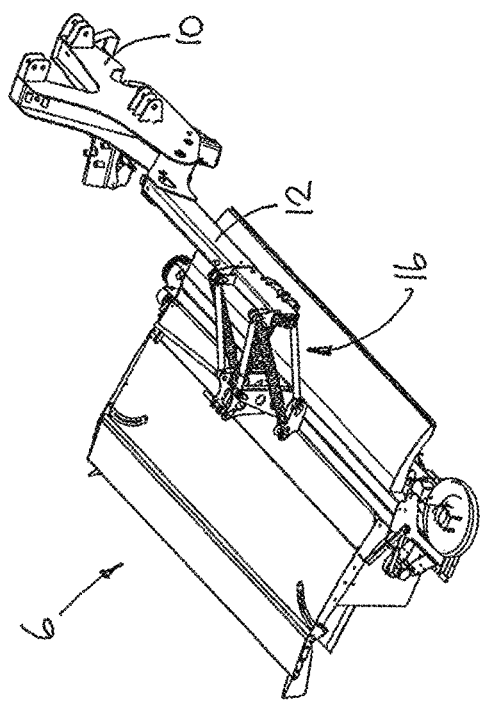
FIG. 7 is an isometric view of the first mowing machine shown in a working position.
Figure 13:
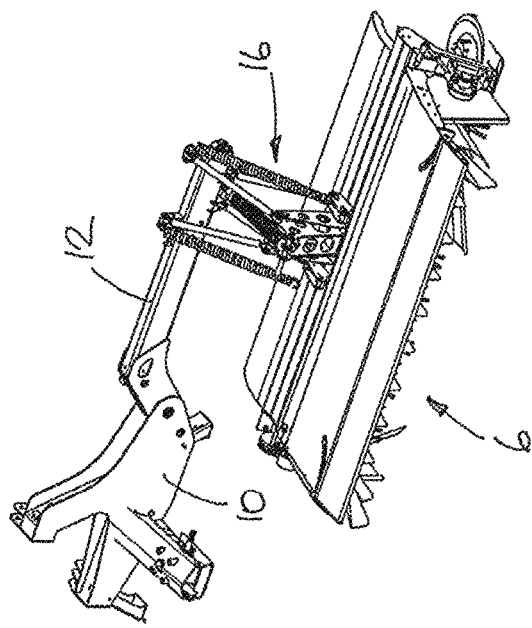
FIG. 13 is an isometric view of the first mowing machine unit with the mowing machine unit shown in a lowered position.
Figure 14:
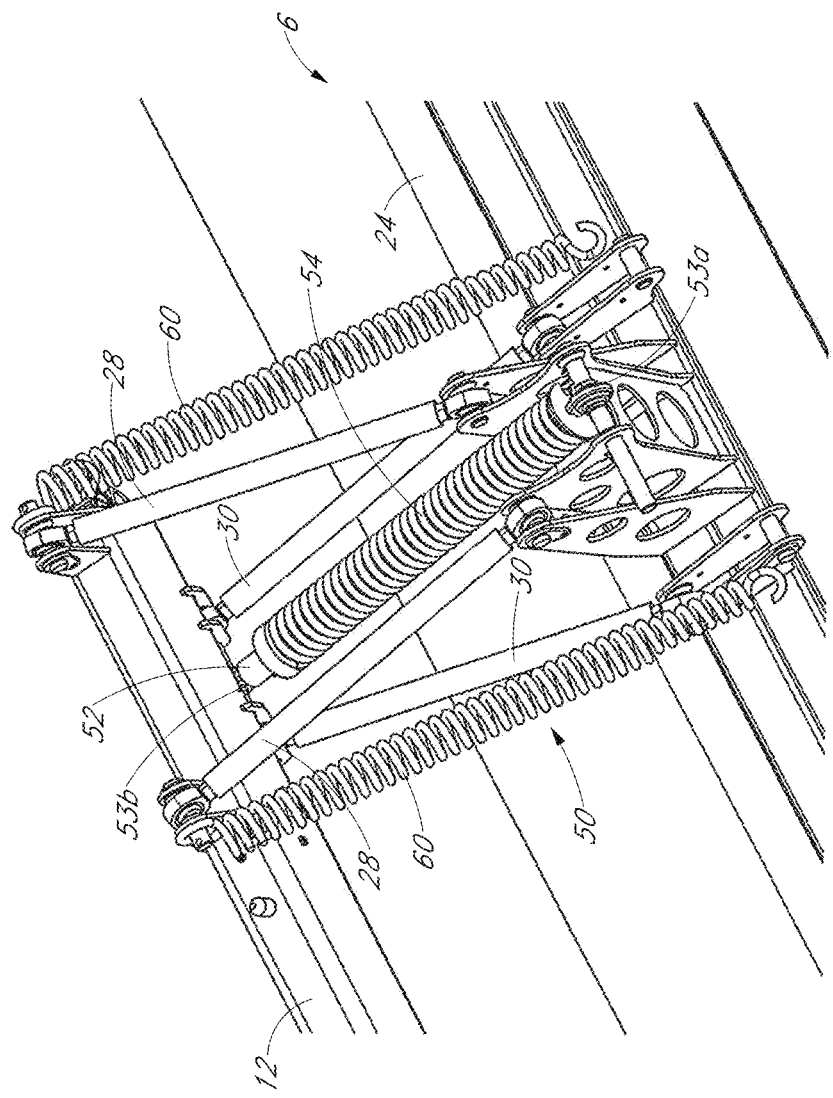
FIG. 14 is an isometric view from above of a suspension system that forms part of the first mowing machine, showing components of the suspension system in more detail.

The suspension system 16 also includes an actuator mechanism 50 (also called a support mechanism) for adjusting the height of the cutter unit 6 relative to the carrier arm 12, which is shown most clearly in FIG. 14. In this example, the actuator mechanism includes a hydraulic ram 52 that extends from a first pivot point 53a between the rear ends of the upper connecting rods 28 to a second pivot point 53b between the forward ends of the lower connecting rods 30. The actuator mechanism 50 also includes a compression spring 54 and a pair of tension springs 60, which extend on either side of the hydraulic ram from a first connection point close to the rear ends of the lower connecting rods 30 to a second connection point close to the forward ends of the upper connecting rods 28. The springs 54, 60 act with the hydraulic ram 52 and help to support the weight of the cutter unit. By supplying hydraulic fluid to the ram 52 it can be extended thereby lifting the cutter unit 6 to the raised position shown in FIGS. 5, 6 and 12. Reducing the quantity of hydraulic fluid supplied to the ram 52 allows the cutter unit to fall under gravity to the working position shown in FIGS. 7, 8 and 11, and subsequently to the lowered position shown in FIGS. 9, 10 and 13, for example for cleaning or maintenance.

Figure 10:
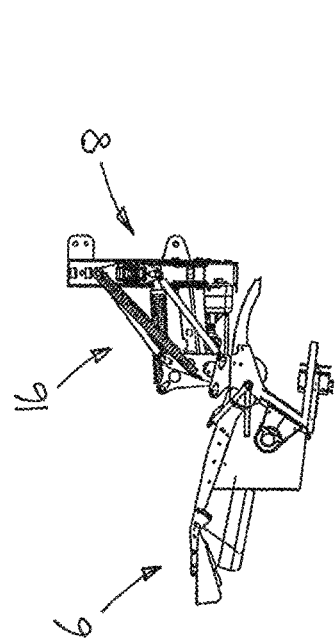
FIG. 10 is a side view of the first mowing machine shown in the lowered position.
Figure 9:
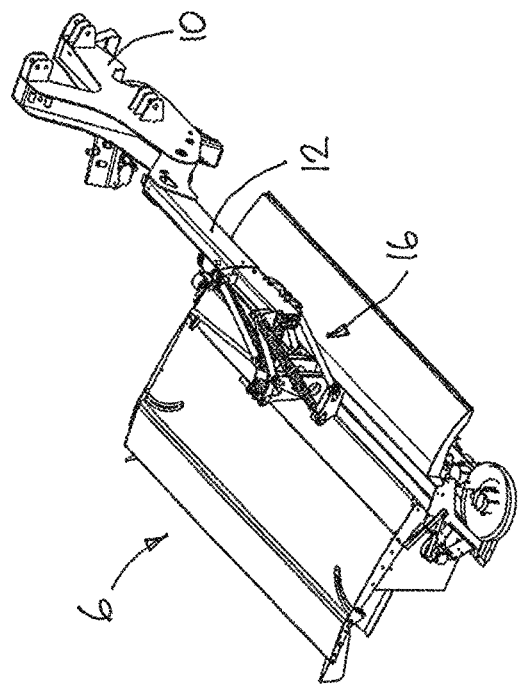
FIG. 9 is an isometric view of the first mowing machine shown in a lowered position.

The suspension system therefore allows the height of the cutter unit 6 relative to the carrier arm 12 to be adjusted and allows the cutter unit to rotate about an axis R that extends substantially in the working direction D, but does not allow the cutter unit 6 to move laterally relative to the carrier arm (i.e. in a direction that is parallel to the width of the cutter unit). The cutter unit 6 can therefore rotate to accommodate undulations in the surface of the ground. The height of the cutter unit 6 relative to the carrier arm 12 can also be adjusted either to adjust the height of cut of the cutter unit, or to allow the cutter unit to be positioned in a raised headland position as shown in FIGS. 5 and 6 that allows the tractor to perform a turn at the end of a field, or in a working position shown in FIGS. 7 and 8, or in a lowered position in which it rests on the ground as shown in FIGS. 9 and 10.

The suspension system 16 allows the cutter head 6 to move vertically relative to the arm 12. Vertical movement of the cutter head 6 can be accommodated without adjusting any energy accumulators associated with the carrier arm, regardless of the length of the arm. The suspension system 16 thus operates independently of any sideshift mechanism for adjusting the length of the carrier arm 12, thereby simplifying operation of the machine.

The stability of the cutter unit when it is in the raised transport position is increased by the provision of the actuator 52 and the compression spring 54, which exert a self-righting force on the cutter unit 6 when it is in the raised position. The actuator 52 and the springs 54 are connected to the carrier arm 12 at pivot point 53b, which is located higher than the virtual axis of rotation of the cutter unit 6 when the carrier arm is in a raised position, and they therefore act to increase the stability of the cutter unit.

Because the connecting rods 28, 30 are subjected in use only to linear forces (i.e. forces of compression or tension that act along the axes of the connecting rods) and do not experience any bending forces they can be relatively light in weight. At the same time, the risk of damage to the suspension system when the cutter unit collides with an obstruction on the ground is substantially reduced.

When the mowing machine is in the transport configuration shown in FIG. 1, the suspension system 16 supports the entire weight of the cutter unit 6 but prevents movement of the cutter unit in the width direction of the cutter unit. The cutter unit 6 can however move under gravity to a stable position relative to the carrier arm 12, which corresponds to the raised position shown in FIGS. 5, 6 and 12. This prevents unwanted movement of the cutter unit 6 during transportation along a road.

Various modifications of the apparatus described above are of course possible. For example, the arrangement of the connecting rods 28, 30 may be reversed, so that the upper connecting rods 28 diverge from the frame plane towards the mo-plane and the lower connecting rods 30 converge from the frame plane to the mo-plane.

The ball joints 32 may be replaced by any other joints that allow rotation about two orthogonal axes, including for example universal joints (Cardan joints).

The hydraulic actuator 52 may be replaced by any other suitable actuator including, for example, an electric linear motor or a motor driven screw. Alternatively, the actuator 52 may be omitted entirely and the weight of the cutter unit may then be supported by resilient support elements, for example springs or other resilient components. Furthermore, one or more of the springs 54, 60 that form part of the suspension system may be omitted or replaced by other resilient support elements, for example gas struts.

Figure 15:
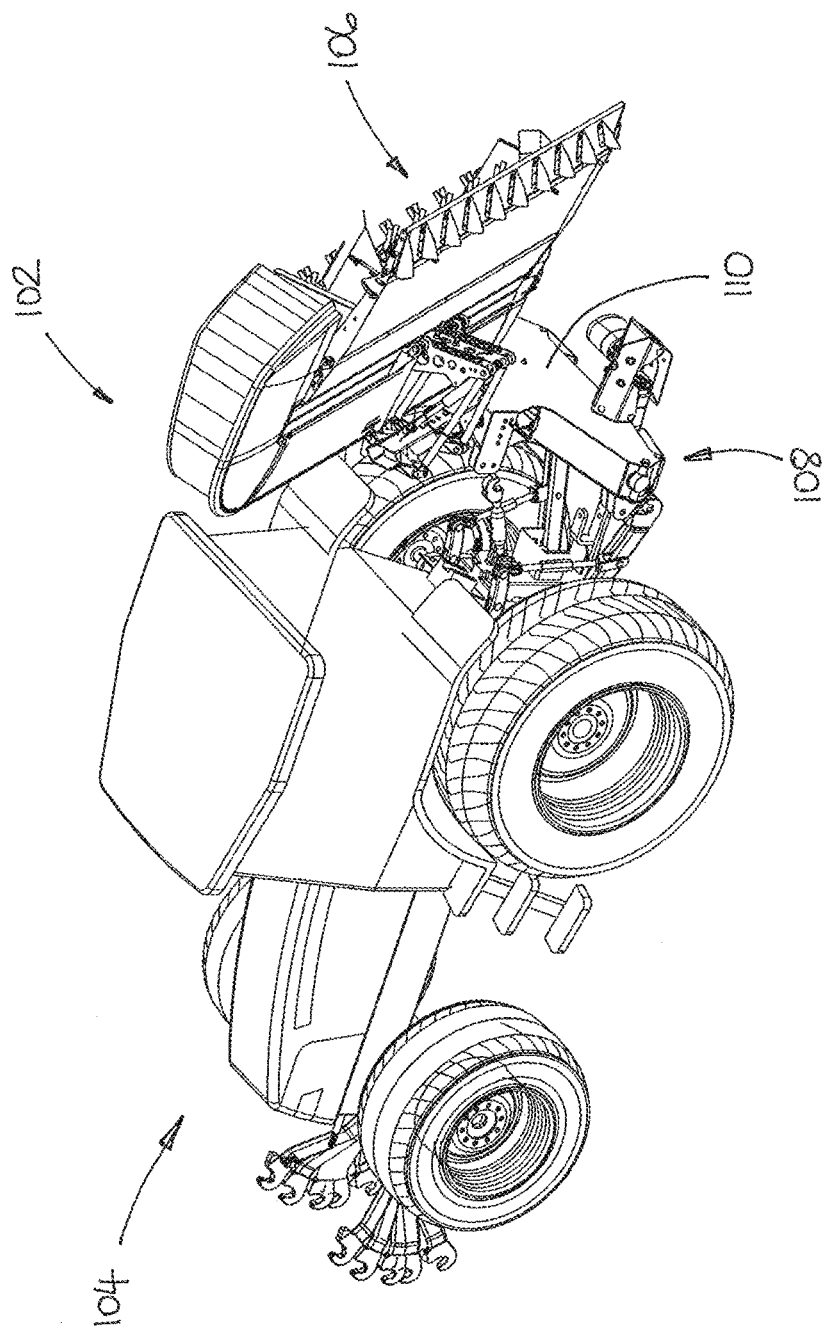
FIG. 15 is an isometric view of a second mowing machine according to an embodiment of the invention mounted on the rear of a tractor, shown in a transport position.
Figure 16:
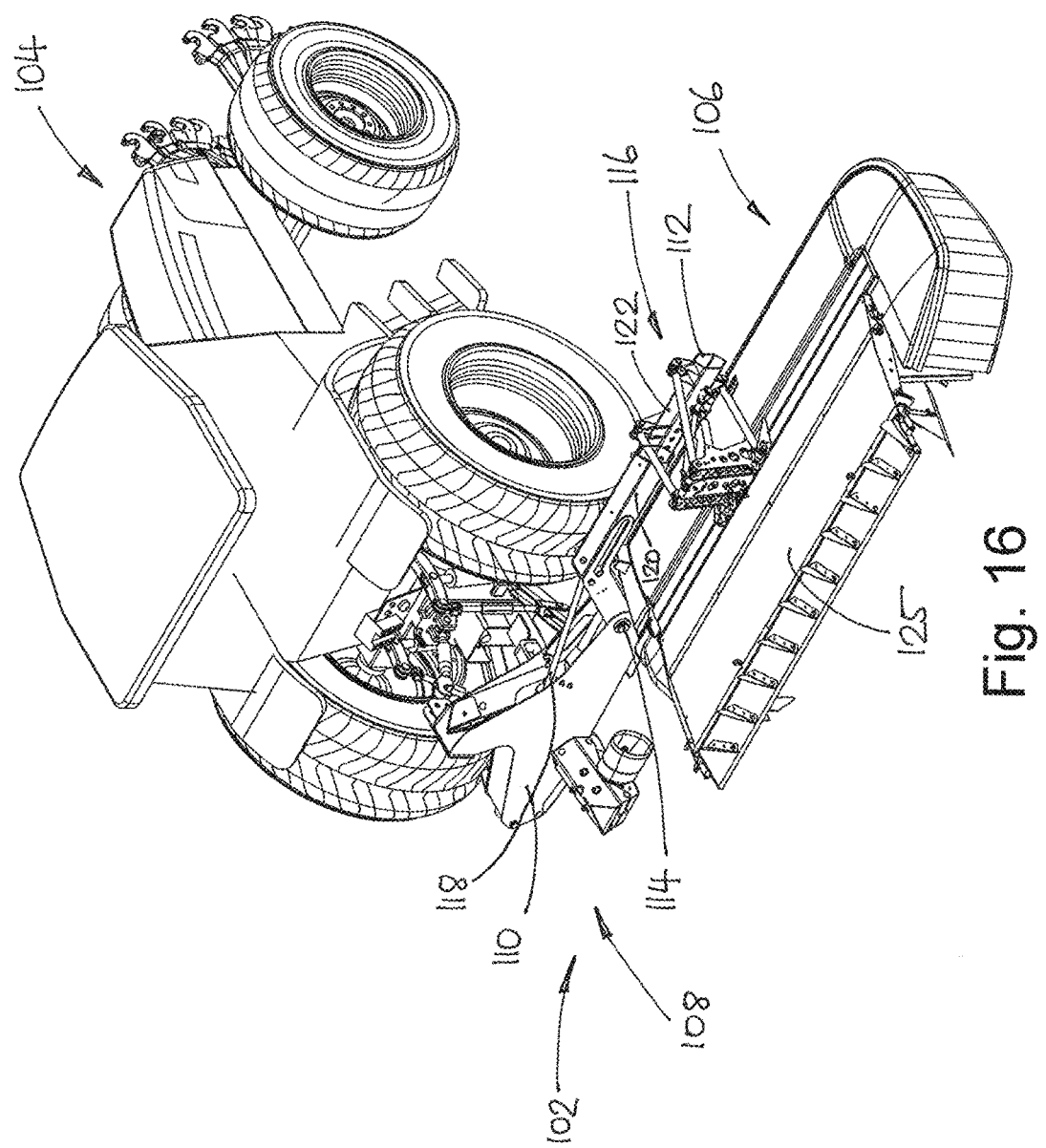
FIG. 16 is an isometric view of the second mowing machine, shown in a raised headland position.

FIGS. 15 and 16 depict a second mowing machine 102 according to an embodiment, which is attached to the rear of a tractor 104 through a conventional three-point mounting system. It should be understood however that this disclosure is also applicable to other kinds of agricultural machine including rakes, tedders, seeding machines and soil working machines, in which an operating unit is attached to the rear of a tractor 104.

The mowing machine 102 includes an operating unit 106 comprising a cutter unit and a carrier assembly 108 for the cutter unit. The carrier assembly 108 includes a mounting structure 110 that is attached to the tractor's three-point mounting system, a carrier arm 112 that is attached to the mounting structure 110 through a pivot mechanism 114, and a suspension system 116 through which the cutter unit 106 is suspended from the free end of the carrier arm 112.

The pivot mechanism 114 allows the carrier arm 112 to be pivoted about a pivot axis X that extends substantially parallel to the working direction D of the cutter unit 106 and includes an actuator 118, for example a hydraulic ram, that can be activated to adjust the rotational position of the arm 112 about the pivot axis X. In FIG. 15 the mowing machine is shown in a transport configuration in which the carrier arm 112 is lifted to an upright position so that the cutter unit 106 is located behind the cab of the tractor 104, while in FIG. 16 the carrier arm 112 is shown in a lowered position in which the carrier arm 112 and the cutter unit 106 are substantially parallel to the ground. When the carrier arm 112 is in the lowered position the cutter unit 106 may be adjusted relative to the carrier arm between a working position and a headland position (shown in FIG. 16) in which it is raised slightly above the working position.

The carrier arm 112 includes an inner section 120, an actuator (not shown) and an outer section 122 that can be extended telescopically relative to the inner section 120 to adjust the lateral position of the cutter unit 106 relative to the tractor 104. The actuator may for example be a hydraulic ram located within the carrier arm 112. The telescopic carrier arm 112 thus allows for sideshift movement of the cutter unit 106 relative to the tractor 104. This allows the operating position of the cutter unit 106 to be adjusted laterally relative to the centerline of the tractor 104. This makes it possible to adjust the operating position of the cutter unit 106 during a mowing operation, for example to ensure that the edge of the cut strip of crop is aligned correctly with the edge of a strip cut previously. Adjustment of the lateral position of the cutter unit may be carried out automatically or semi-automatically, for example using an operating method as described in EP1321027B1.

The cutter unit 106 is largely conventional and includes a plurality of cutter heads (not shown) attached to a support frame 124 and an optional conditioning unit 125 for conditioning the crop cut by the cutter heads. The cutter unit 106 is driven via a drive shaft (not shown) from the power take-off unit of the tractor 104.

Figure 27:
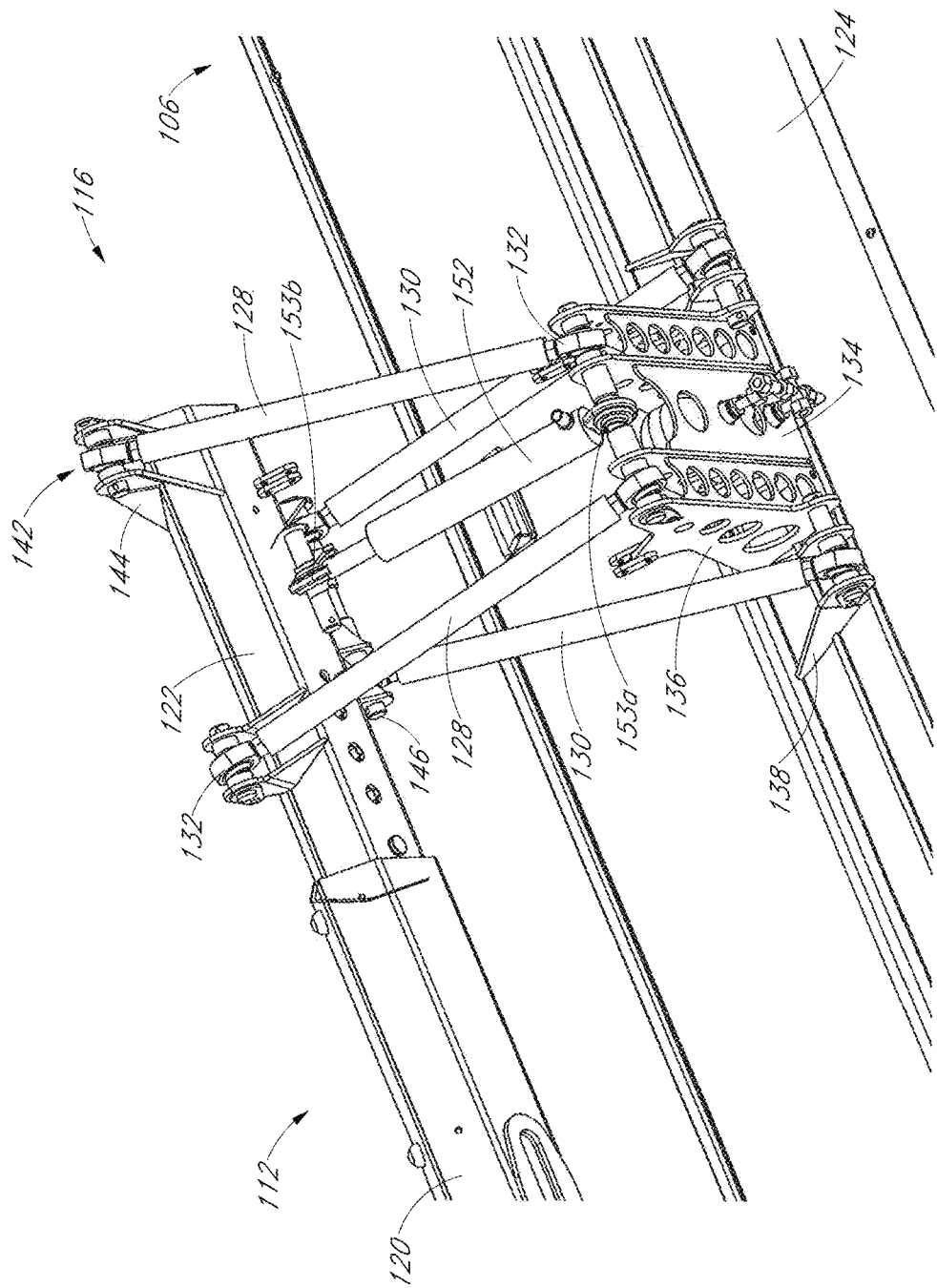
FIG. 27 is an isometric view from above of a suspension system that forms part of the second mowing machine, showing components of the suspension system in more detail.

The cutter unit 106 is suspended from the free end of the carrier arm 112 by the suspension system 116, which is shown most clearly in FIG. 27. Components of the suspension system 116 are also shown schematically in FIG. 17, together with the carrier arm 112 and the support frame 124 of the cutter unit. The suspension system 116 includes two pairs of connecting rods, comprising a pair of upper connecting rods 128 and a pair of lower connecting rods 130. The connecting rods 128, 130 all extend approximately in the working direction of the mowing machine and are attached via ball joints 132 to the cutter unit 106 and the carrier arm 112.

The rear end of each connecting rod 128,130 is attached via a spherical ball joint to a mounting structure 134 that extends upwards from the support frame 124 of the cutter unit 106 and is located approximately centrally with respect to the working width of the cutter unit. In this embodiment the mounting structure includes two pairs of tall inner plates 136 that are connected to the upper connecting rods 128 and two pairs of shorter outer plates 138 that are connected to the lower connecting rods 130. As with the first embodiment shown in FIG. 4, the ball joints 132 at the rear ends of the connecting rods 128,130 lie in a first plane referred to herein as the mo-unit plane. The ball joints 132 at the rear ends of the upper connecting rods 128 are positioned more closely together than the ball joints 132 at the rear ends of the lower connecting rods 130.

The forward end of each connecting rod 128, 130 is attached via a second spherical ball joint 132 to a second mounting structure 142 provided at the free end of the carrier arm 112. In this embodiment the second mounting structure 42 includes two pairs of upper plates 144 provided on the upper part of the carrier arm 112 and two pairs of lower plates 146 provided on the lower part of the carrier arm 112. Each of the connecting rods 128, 130 is connected to one of these plates via a second ball joint 132. As with the first embodiment shown in FIG. 4, the second ball joints lie in a second plane referred to herein as the frame plane. The ball joints at the forward ends of the lower connecting rods 130 are positioned more closely together than the ball joints at the forward ends of the upper connecting rods 128.

The upper connecting rods 128 lie in an upper plane and the lower connecting rods lie in a lower plane, and in this embodiment the upper plane is parallel to the lower plane. More generally, a line normal to the upper plane and a line normal to the lower plane are each substantially perpendicular to a width axis of the cutter unit. This arrangement allows the cutter unit 106 to move substantially vertically relative to the carrier arm 112 while maintaining the cutter unit in an upright position (i.e. without rotation of the cutter unit about a horizontal axis). Alternatively, the upper and lower planes may be non-parallel, in which case vertical movement of the cutter unit relative to the carrier arm will cause a degree of rotation of the cutter unit 106 about a horizontal axis, which may be permissible in certain applications.

As explained above, the ends of the upper connecting rods 128 are closer together in the mo-plane than the frame plane, and the upper connecting rods 128 therefore converge from the frame plane towards mo-plane. Conversely, the ends of the lower connecting rods 130 are further apart in the mo-plane than the frame plane and the lower connecting rods 130 therefore diverge from the frame plane to the mo-plane. The upper and lower connecting rods 128, 130 therefore act like reversed A-frames, which prevent horizontal movement of the cutter unit 116 relative to the carrier arm 112.

Because the connecting rods 128, 130 are connected to the carrier arm 112 and the mounting structure 134 of the cutter unit 106 via ball joints, the cutter unit 106 is able to rotate relative to the carrier arm about an axis of rotation R that extends approximately in the working direction of the cutter unit. This allows the cutter unit to follow the contours of the ground while working.

As with the first embodiment shown in FIG. 4, the actual axis of rotation R extends between two points, one in the mo-plane and the other in the frame plane, each point being located at the intersection of lines drawn between the attachment points of diagonally opposed ball joints 132. The axis of rotation R therefore lies in a vertical plane that is parallel to the working direction D of the cutter unit, but is inclined downwards in the working direction.

Figure 17:
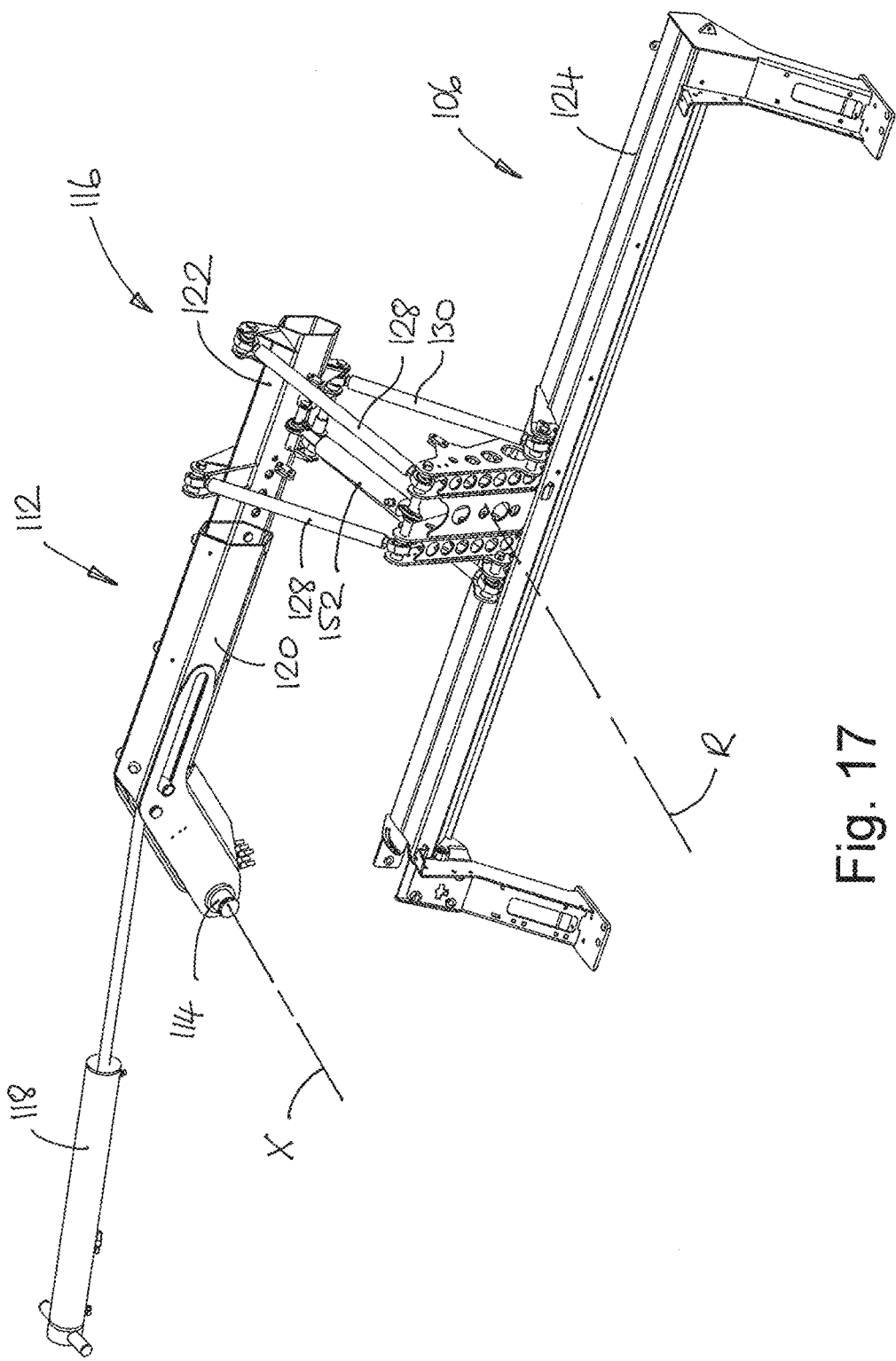
FIG. 17 is an isometric view showing schematically certain components of the suspension system.

It should be understood that the connecting rod arrangement illustrated in FIG. 17 may be inverted, whereby the upper pair of connecting rods 128 diverge from the frame plane to the mo-plane and the lower pair of arms 130 converge from the frame plane to the mo-plane. This does not affect operation of the suspension system 116.

Figure 25:
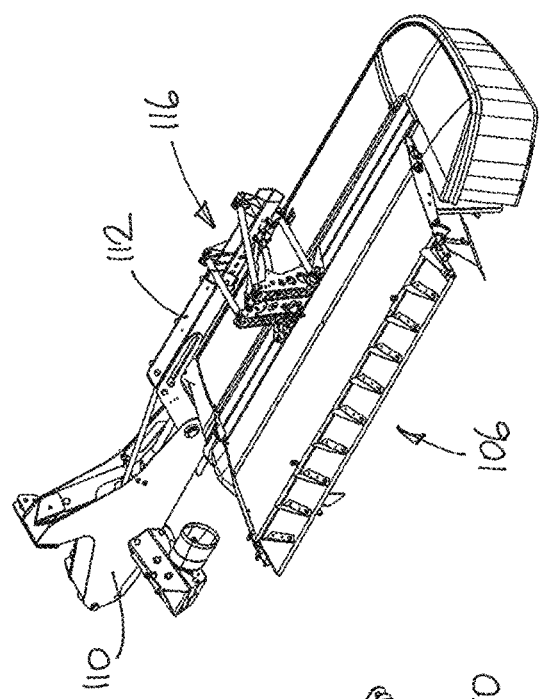
FIG. 25 is an isometric view of the second mowing machine with the mowing machine unit shown in a raised headland position.
Figure 24:
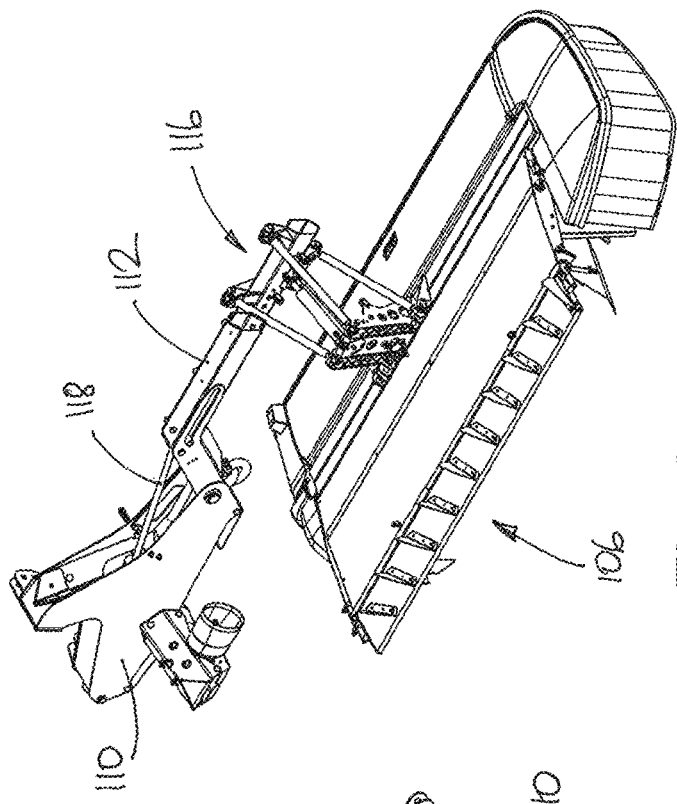
FIG. 24 is an isometric view of the second mowing machine with the mowing machine shown in a working position.

The suspension system 116 also includes an actuator 152 for adjusting the height of the cutter unit 106 relative to the carrier arm 112, which is shown most clearly in FIG. 27. In this example, the actuator 152 comprises a hydraulic ram that extends from a first pivot point 153a between the rear ends of the upper connecting rods 128 to a second pivot point 153b between the forward ends of the lower connecting rods 130. In this embodiment the first pivot point 153a and the ball joints 132 at the rear ends of the upper connecting rods 128 are coaxial, the actuator 152 being connected to the cutter unit 106 at the same height as the upper connecting rods 128. By supplying hydraulic fluid to the ram 152 it can be extended thereby lifting the cutter unit 106 to the raised position shown in FIGS. 18, 19 and 25. Reducing the quantity of hydraulic fluid supplied to the ram 152 allows the cutter unit to fall under gravity to the working position shown in FIGS. 20, 21 and 24, and subsequently to the lowered position shown in FIGS. 22, 23 and 26, for example for cleaning or maintenance.

Figure 19:
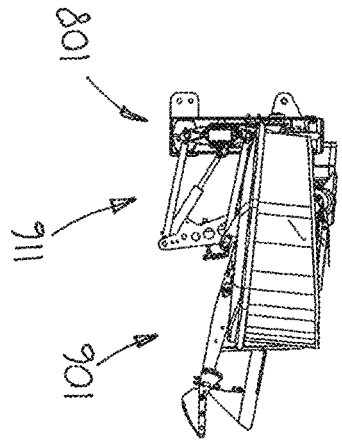
FIG. 19 is a side view of the second mowing machine shown in the raised headline position.
Figure 18:
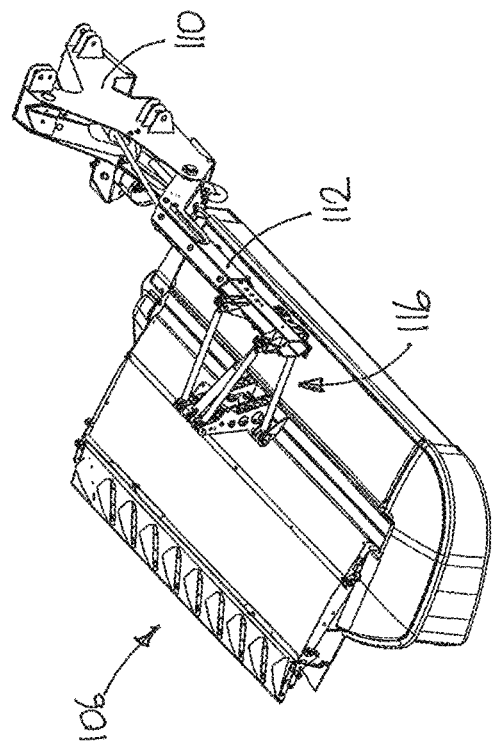
FIG. 18 is an isometric view of the second mowing machine shown in a raised headland position.
Figure 21:
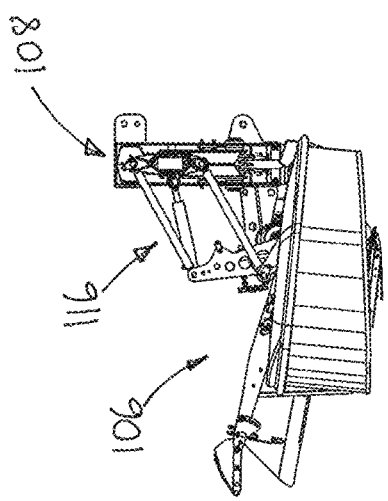
FIG. 21 is a side view of the second mowing machine shown in a working position.
Figure 20:
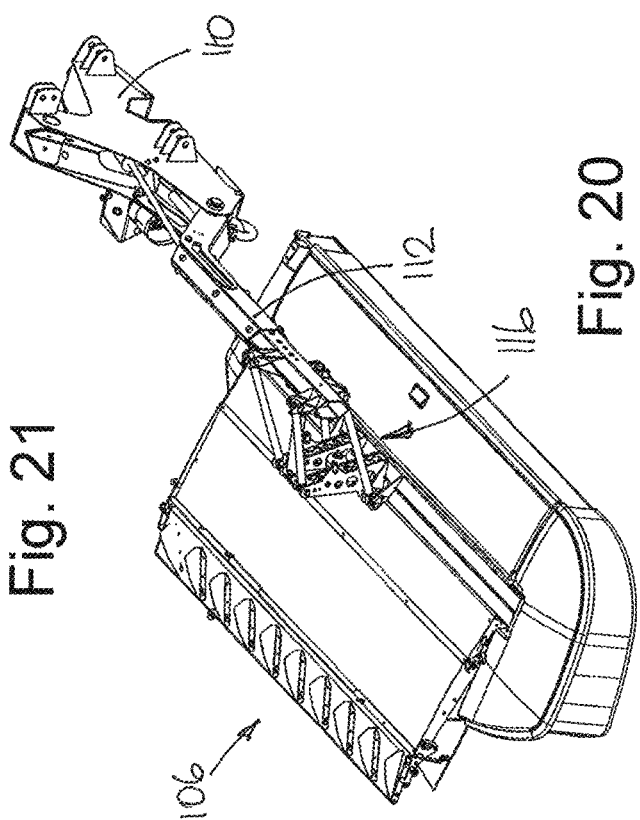
FIG. 20 is an isometric view of the second mowing machine shown in a working position.

The suspension system therefore allows the height of the cutter unit 106 relative to the carrier arm 112 to be adjusted and allows the cutter unit to rotate about an axis R that extends substantially in the working direction D, but does not allow the cutter unit 106 to move laterally relative to the carrier arm (i.e. in a direction that is parallel to the width of the cutter unit). The cutter unit 106 can therefore rotate to accommodate undulations in the surface of the ground. The height of the cutter unit 106 relative to the carrier arm 112 can also be adjusted either to adjust the height of cut of the cutter unit, or to allow the cutter unit to be positioned in a raised headland position as shown in FIGS. 18 and 19 that allows the tractor to perform a turn at the end of a field, or in a working position as shown in FIGS. 20 and 21, or in a lowered position in which it rests on the ground as shown in FIGS. 22 and 23.

The suspension system 116 allows the cutter head 106 to move vertically relative to the arm 112. Vertical movement of the cutter head 106 can be accommodated without adjusting any energy accumulators associated with the carrier arm 112, regardless of the length of the arm. The suspension system 116 thus operates independently of any sideshift mechanism for adjusting the length of the carrier arm 112, thereby simplifying operation of the machine.

The stability of the cutter unit when it is in the raised transport position is increased by the provision of the actuator 152, which exert a self-righting force on the cutter unit 106 when it is in the raised position. The actuator 152 is connected to the carrier arm 112 at pivot point 153b, which is located higher than the virtual axis of rotation R of the cutter unit 106 when the carrier arm is in a raised position, and it therefore acts to increase the stability of the cutter unit.

Because the connecting rods 128, 130 are subjected in use only to linear forces (i.e. forces of compression or tension that act along the axes of the connecting rods) and do not experience any bending forces they can be relatively light in weight. At the same time, the risk of damage to the suspension system when the cutter unit collides with an obstruction on the ground is substantially reduced.

When the mowing machine is in the transport configuration shown in FIG. 15, the suspension system 116 supports the entire weight of the cutter unit 106 but prevents movement of the cutter unit in the width direction of the cutter unit. The cutter unit 106 can however move under gravity to a stable position relative to the carrier arm 112, which corresponds to the raised position shown in FIGS. 18, 19 and 25. This prevents unwanted movement of the cutter unit 106 during transportation along a road.

Various modifications of the apparatus described above are of course possible. For example, the arrangement of the connecting rods 128, 130 may be reversed, so that the upper connecting rods 128 diverge from the frame plane towards the mo-plane and the lower connecting rods 130 converge from the frame plane to the mo-plane.

The ball joints 132 may be replaced by any other joints that allow rotation about two orthogonal axes, including for example universal joints (Cardan joints).

The hydraulic actuator 152 may be replaced by any other suitable actuator including, for example, an electric linear motor or a motor driven screw. Alternatively, the actuator 152 may be omitted entirely and the weight of the cutter unit may then be supported by resilient support elements, for example springs or other resilient components.

The suspension system comprising the connecting rods and optionally the mounting structures, springs and actuator may be supplied separately for retrofitting to an existing cutter unit. Similarly, the carrier assembly comprising the carrier arm and the suspension system may be supplied separately for retrofitting to an existing cutter unit.

As previously indicated, the invention is not limited to mowing machines but is also applicable to other kinds of agricultural machine including rakes, tedders, seeding machines and soil working machines in which an operating unit is attached to the rear of a tractor 4.

The invention claimed is:

1. An agricultural machine comprising:
   an operating unit; and
   a carrier assembly for the operating unit, the carrier assembly including:
      a mounting structure configured for mounting the agricultural machine on a carrier vehicle;
      a carrier arm;
      a pivot mechanism configured to allow pivoting movement of the carrier arm relative to the mounting structure about a pivot axis that extends substantially parallel to a working direction of the agricultural machine between an upright position and a lowered position; and
      a suspension system by which the operating unit is suspended from the carrier arm;
   wherein the suspension system suspends the operating unit solely from a center point of the operating unit and allows the operating unit to rotate about an axis of rotation of the operating unit that extends substantially in the working direction;
   wherein the suspension system includes a support mechanism configured to support the weight of the operating unit and allow a height of the operating unit relative to the carrier arm to change; and
   wherein the support mechanism includes an actuator that is located centrally on the axis of rotation of the operating unit and is configured to act between the operating unit and the carrier arm to adjust the height of the operating unit relative to the carrier arm.

2. An agricultural machine according to claim 1, wherein the suspension system includes two pairs of connecting rods, comprising a pair of upper connecting rods and a pair of lower connecting rods, each said connecting rod being attached via joints to the operating unit and the carrier arm, wherein a first pair of said upper and lower connecting rods diverge in a working direction of the operating unit and a second pair of said upper and lower connecting rods converge in a working direction of the operating unit.

3. An agricultural machine according to claim 2, wherein the upper connecting rods lie in an upper plane and the lower connecting rods lie in a lower plane.

4. An agricultural machine according to claim 3, wherein a line normal to the upper plane and a line normal to the lower plane are substantially perpendicular to a width axis of the operating unit.

5. An agricultural machine according to claim 3, wherein the upper plane is substantially parallel to the lower plane.

6. An agricultural machine according to claim 1, wherein the carrier assembly includes a drive mechanism for driving pivoting movement of the carrier arm.

7. An agricultural machine according to claim 1, wherein the carrier arm includes an inner arm section and an outer arm section that can be extended relative to the inner arm section to adjust the length of the carrier arm.

8. An agricultural machine according to claim 7, including an actuator for adjusting the length of the carrier arm.

9. An agricultural machine according to claim 1, wherein the machine is a mowing machine and the operating unit is a cutter unit.

10. An agricultural mowing machine according to claim 9, wherein the cutter unit includes a plurality of rotary cutter heads.

11. A carrier assembly for carrying an operating unit of an agricultural machine, the carrier assembly comprising:
- a mounting structure configured for mounting the carrier assembly on a carrier vehicle;
- a carrier arm;
- a pivot mechanism configured to allow pivoting movement of the carrier arm relative to the mounting structure about a pivot axis that extends substantially parallel to a working direction of the agricultural machine between an upright position and a lowered position, and
- a suspension system configured to suspend the operating unit from the carrier arm, wherein the suspension system is configured to suspend the operating unit solely from a center point of the operating unit and to allow the operating unit to rotate about an axis of rotation of the operating unit that extends substantially in the working direction of the agricultural machine; wherein the suspension system includes a support mechanism configured to support a weight of the operating unit and allow the height of the operating unit relative to the arm to change, and the support mechanism includes an actuator that is located centrally on the axis of rotation of the operating unit and is configured to act between the operating unit and the carrier arm to adjust the height of the operating unit relative to the carrier arm.

12. A carrier assembly according to claim 11, wherein the agricultural machine is a mowing machine and the operating unit is a cutter unit.

13. A carrier assembly according to claim 11, said suspension system including two pairs of connecting rods comprising a pair of upper connecting rods and a pair of lower connecting rods, each said connecting rod being attached via joints to the mounting structure and the carrier arm, wherein a first pair of said upper and lower connecting rods diverge in a working direction of the operating unit and a second pair of said upper and lower connecting rods converge in a working direction of the operating unit.

* * * * *